United States Patent [19]

Burack et al.

[11] Patent Number: 5,582,673
[45] Date of Patent: Dec. 10, 1996

[54] OPTICAL FIBER ENCAPSULATION TECHNIQUES

[75] Inventors: John J. Burack, Toms River; Hung C. Ling, Princeton; Frederick Simchock, Trenton, all of N.J.

[73] Assignee: Lucent Technologies Inc., Murray Hill, N.J.

[21] Appl. No.: 375,756

[22] Filed: Jan. 20, 1995

Related U.S. Application Data

[63] Continuation-in-part of Ser. No. 201,966, Feb. 24, 1994, Pat. No. 5,394,504.

[51] Int. Cl.$^6$ ............................................. B32B 31/00
[52] U.S. Cl. ............................ 156/285; 156/382; 385/80; 385/139
[58] Field of Search .................................. 156/51, 52, 56, 156/176–179, 285, 297–302, 309.6, 311, 312, 382; 385/31, 76, 77, 78, 80, 95–99, 114, 115, 123, 128, 129, 139, 147

[56] References Cited

U.S. PATENT DOCUMENTS

| | | | |
|---|---|---|---|
| 3,271,214 | 9/1966 | Tabor | 156/52 |
| 3,666,587 | 5/1972 | Nagao | 156/199 |
| 3,871,935 | 3/1975 | Gloge et al. | 385/97 X |
| 4,138,193 | 2/1979 | Olszewski et al. | 385/114 |
| 4,541,882 | 9/1985 | Lassen | 156/150 |
| 4,715,700 | 12/1987 | Daniel | 385/31 |
| 5,204,925 | 4/1993 | Bonanni et al. | 385/89 |
| 5,259,051 | 11/1993 | Burack et al. | 385/76 |
| 5,292,390 | 3/1994 | Burack et al. | 156/176 |
| 5,394,504 | 2/1995 | Burack et al. | 385/139 |

OTHER PUBLICATIONS

"Electro–Optical Board Technology Based on Discrete Wiring," by W. Delbare et al., presented at 1991 International Electronics Packaging Conference, Sep. 17, 1991, pp. 604–618.

*Primary Examiner*—John D. Lee

[57] ABSTRACT

A method for encapsulating optical fibers (26, FIG. 2) comprises the steps of bonding optical fiber to a first surface of a rigid flat member (17) and placing the flat member in a substantially air-tight chamber (10, FIG. 1). An encapsulating sheet (13) is located in the air-tight chamber, such that it faces the flat member. The air pressure on the flat member is then made to be significantly lower than the air pressure on the encapsulating sheet, thereby to cause the encapsulating sheet (13) to press against the flat member (17, FIG. 3). The encapsulating sheet is made of a flexible flame-resistant material that maintains its structural integrity and does not melt or ignite at temperatures of at least two hundred degrees Centigrade. For example, the encapsulating sheet may be of Kapton (a trademark), doped Mylar (a trademark) or aluminum foil. The encapsulating sheet (13) is bonded to the flat member by an adhesive (31, FIG. 2) so that, after the sheet has been pressed against the optical fibers (26), it thereafter permanently supports each optical fiber in its assigned position.

20 Claims, 2 Drawing Sheets ial fibers 26 have been routed and bonded in accordance with the Burack et al. '051 patent, the flexible plastic substrate 29 is separated from the flat member 17, and it may be stored for later use.

OPTICAL FIBER ENCAPSULATION TECHNIQUES

This is a Continuation-In-Part of the application of Burack et al., Ser. No. 08/201,966, filed Feb. 24, 1994, now U.S. Pat. No. 5,394,504, hereby incorporated by reference herein.

TECHNICAL FIELD

This invention relates to optical fiber interconnections and, more particularly, to techniques for encapsulating optical fibers that have been bonded to one surface of a member such as an optical backplane.

BACKGROUND OF THE INVENTION

The patent of Burack et al., U.S. Pat. No. 5,259,051 ('051), granted Nov. 2, 1993, hereby incorporated by reference herein, describes a method for making optical backplanes by using a robotic routing machine to apply optical fibers to a flat surface of a flexible plastic substrate. The fibers are bonded to the substrate by a pressure-sensitive adhesive, and after routing they are covered by a thermoplastic sheet that encapsulates them to protect them, to give structural stability, and to keep the optical fibers in place during the handling of the optical backplane. The component optical fibers are typically used as large-capacity transmission lines between printed wiring boards or between optical circuits.

The Burack et al. '051 patent, the patent of Burack et al., U.S. Pat. No. 5,292,390, granted Mar. 8, 1994, and the aforementioned copending application of Burack et al., all describe the use of a thermoplastic material such as polyurethane for encapsulating or covering the optical fibers of an optical backplane. A problem with optical backplanes made from this material is that they do not meet the flammability specifications required for certain electronic equipment such as complex switching systems. Thermoplastic, by its nature, flows when heated, which may affect the structural integrity of the optical backplane. More importantly, when it flows in response, for example, to a flame, it exposes the underlying adhesive to the air, which could cause the adhesive to ignite. Present flammability requirements could be met if the encapsulant were of a material capable of withstanding a flame and a heat of two hundred degrees Centigrade without igniting or losing its structural integrity.

The above-described references describe the need for an encapsulant that stabilizes the ends of the optical fibers with great precision, and yet does not exert such a force on the fibers to break them, particularly at "crossover" locations, that is, locations at which one fiber overlaps one or more other fibers. There is therefore a continuing need for an encapsulant that will meet these requirements and yet will not be significantly structurally affected by temperatures of at least two hundred degrees Centigrade.

SUMMARY OF THE INVENTION

A method for encapsulating optical fibers comprises the steps of bonding optical fiber to a first surface of a rigid flat member and placing the flat member in a substantially air-tight chamber. An encapsulating sheet is located in the air-tight chamber, such that it faces the flat member. The air pressure on the flat member is then made to be significantly lower than the air pressure on the encapsulating sheet, thereby to cause the encapsulating sheet to press against the flat member. The encapsulating sheet is made of a flexible material that maintains its structural integrity and does not melt or ignite at temperatures of at least two hundred degrees Centigrade. For example, the encapsulating sheet may be of Kapton (a trademark), doped Mylar (a trademark) or aluminum foil. The encapsulating sheet is bonded to the flat member by an adhesive so that, after it has been pressed against the optical fibers, it thereafter permanently supports each optical fiber in its assigned position.

These and other objects, features and benefits of the invention will be better understood from a consideration of the following detailed description taken in conjunction with the accompanying drawing.

DETAILED DESCRIPTION

Figure 1:
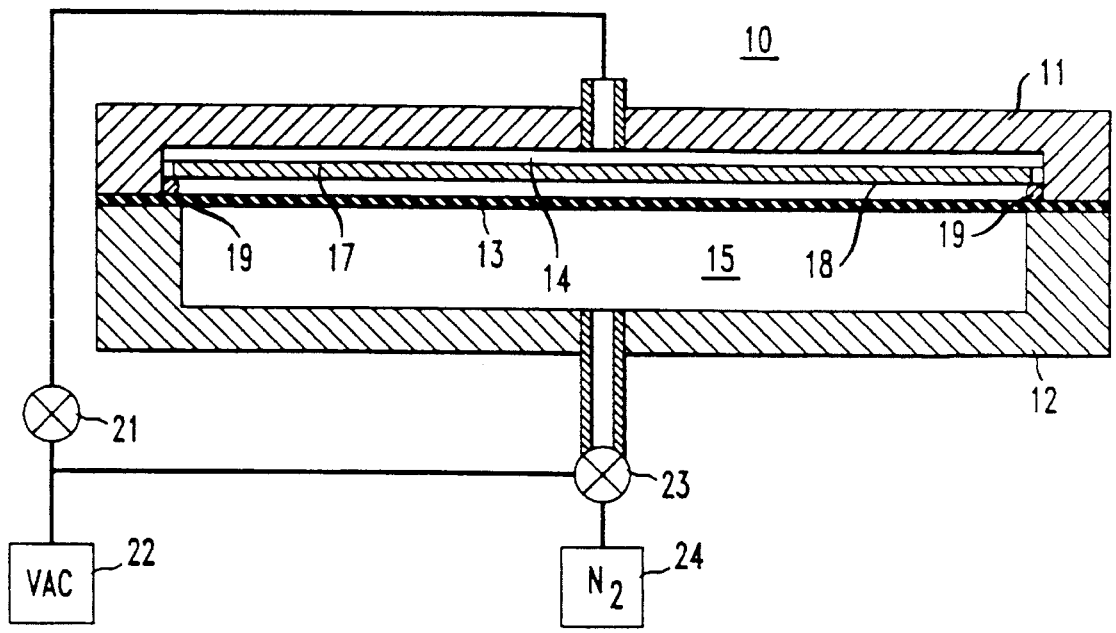
FIG. 1 is a schematic sectional view of an air-tight chamber used for encapsulating optical fibers.

The drawings are schematic, with in some cases dimensions being purposely distorted to aid in clarity of exposition. Referring now to FIG. 1, there is shown a substantially air-tight chamber 10 which is used for encapsulating optical fibers in accordance with one embodiment of the invention. The air-tight chamber 10 is defined by two enclosure members 11 and 12 which are clamped to opposite sides of an encapsulating sheet 13. Apparatus for sealing together the two enclosure members is not shown for reasons of simplicity, but pressure is applied, for example, by a press, or by a clamping apparatus affixed to the enclosure members 11 and 12, which is sufficient to give an air-tight fit. The encapsulating sheet 13 is of a material that is substantially impermeable to air; it extends Mound the entire periphery of air-tight chamber 10 and effectively constitutes an air-tight gasket between enclosure members 11 and 12. The sheet 13 thus effectively divides the air-tight chamber 10 into an upper chamber portion 14 and a lower chamber portion 15 which are mutually substantially hermetically sealed.

The upper chamber portion 14 includes a flat member 17 having a first surface 18 to which optical fibers (not shown) have been bonded. The purpose of the apparatus of FIG. 1 is to encapsulate the optical fibers by bonding the sheet 13 to the first surface 18 of the flat member 17, which contains the fibers. Flat member 17 is separated from sheet 13 by spacers 19. The upper chamber portion 14 is connected via a valve 21 to vacuum apparatus 22. Lower chamber portion 15 is connected via a valve 23 either to the vacuum apparatus 22 or to a source of gas 24 such as nitrogen gas.

The apparatus of FIG. 1 is designed to encapsulate optical fibers that have been routed onto a surface of a sheet of flexible plastic. Referring to the enlarged fragmentary section of FIG. 2, optical fibers 26 are illustratively bonded to a flexible plastic substrate 29 by pressure-sensitive adhesive 30 by the techniques described in the Burack et al. '051 patent. The fibers 26 may be grouped in groups of three, as shown, for reasons given in the Burack et al. '051 patent, and there may be a plurality of crossovers (not shown) in which certain of the optical fibers overlap other optical fibers. The flexible plastic substrate 29 is bonded by a temporary adhesive, for example, Flexmark (TM) DFM 700 Clear V-302 ULP, available from the Flexcon Company, Spencer, Mass., U.S.A., to the flat rigid member 17, which may be a flat sheet of aluminum for example. The pressure sensitive adhesive 30 may be number 711 adhesive, available from Adchem Corp. of Westbury, N.Y., U.S.A. After the optical fiber routing, a second adhesive layer 31 is applied to the entire surface including optical fibers 26; adhesive layer 31 may also be number 711 adhesive.

Figure 3:
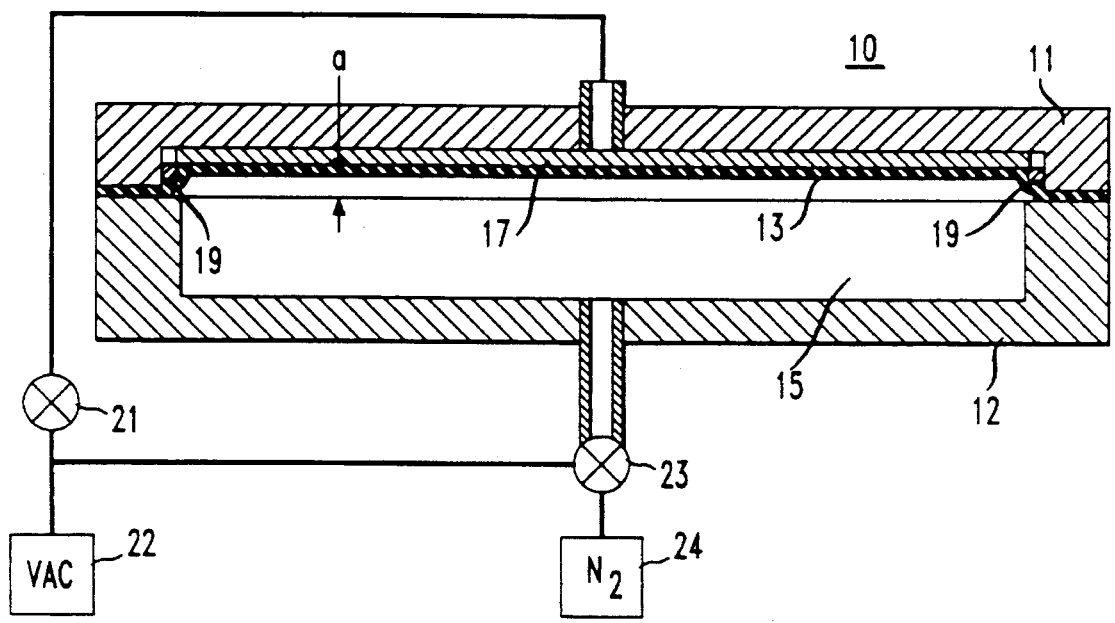
FIG. 3 is a view of the chamber of FIG. 1 at a subsequent stage of the process.
Figure 2:
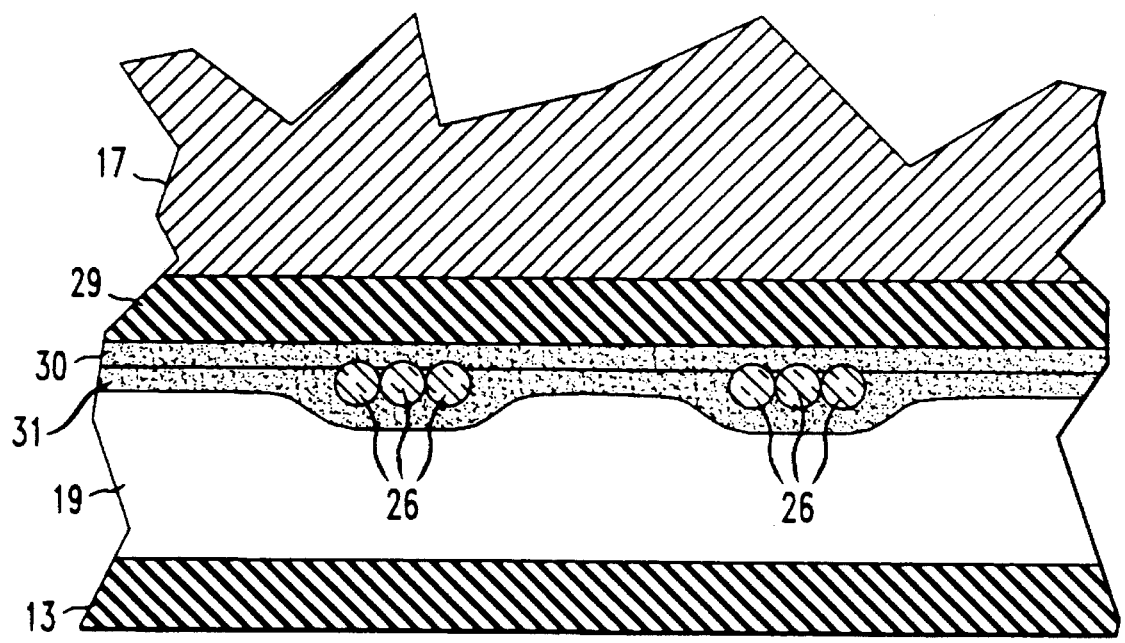
FIG. 2 is a schematic fragmentary sectional enlargement showing some of the components of the apparatus of FIG. 1.

In operation, both valves 21 and 23 of FIG. 1 are first connected to vacuum apparatus 22 to provide a partial vacuum in both the upper chamber portion 14 and the lower chamber portion 15. The purpose of this operation is to draw out the gas between sheet 13 and flat member 17. Next, valve 21 is connected to vacuum apparatus 22, while valve 23 is connected to gas source 24, typically nitrogen. This produces a much lower gas pressure in upper chamber portion 14 than in lower chamber portion 15. As a consequence, the flat member 17, spacers 19 and the encapsulating sheet 13 are drawn up vertically as shown in FIG. 3 to bear against the enclosure member 11. The upward gas pressure exerted on sheet 13 extends uniformly along its entire area. The adhesive layer 31 causes the sheet 13 to adhere to the flat member 17, thereby to encapsulate the optical fibers bonded to the surface of flat member 17. Thereafter, the bonded structure is removed from chamber 10, and the plastic substrate 29 of FIG. 2 is peeled away from rigid member 32. The composite structure including plastic substrate 29, optical fibers 26 and bonded encapsulating sheet 13 then constitutes, for example, an optical backplane.

The applied gas pressure differential is typically fifteen to forty pounds per square inch. The advantage of applying pressure as shown is that the pressure is inherently equally distributed, rather than concentrated at protrusions such as crossovers. As a consequence, for a given yield, higher pressures can normally be used in the apparatus of FIG. 3 than could be used if the pressure were applied mechanically. Thus, for a given yield, the encapsulation produced with the invention provides better encasement and structural support for the optical fibers.

In accordance with the invention, the encapsulating sheet 13 is made of a flexible flame-resistant material that maintains its structural integrity and does not melt or ignite at temperatures of at least two hundred degrees Centigrade. This represents a departure from prior encapsulations for routed optical fibers, which required that the encapsulating sheet be made of a thermoplastic such as polyurethane which, when heated, would flow slightly to encase firmly the optical fibers without the need for applying much force. Our experiments show that, with the invention, it is not necessary to use a thermoplastic as the encapsulant.

Referring to FIG. 2, it is known that the substrate 29 may be made of Kapton (a trademark), a flexible flame-resistant, heat-resistant material. With the invention, encapsulating sheet 13 may also be of Kapton. When the encapsulating sheet is forced against substrate 29, it does not flow around the optical fibers the way a heated thermoplastic does, but it is sufficiently flexible to conform itself to the surface it contacts, thus firmly encasing the optical fibers. Even with crossovers, we have found that the yield of perfectly working optical backplanes is very high by this method. Kapton is a plastic material, is flexible, but does not flow in response to heat and maintains its structural integrity at temperatures well in excess of two hundred degrees Centigrade. Another advantage of Kapton is that there is no need to heat the structure during the encapsulating process; thus, during the entirety of the process, air-tight chamber 10 is maintained at substantially room temperature. Both Kapton layers 29 and 13 of FIG. 2 may have a thickness of 0.001 to 0.010 inch.

Commercially available aluminum foil has also been successfully used as the encapsulating sheet 13. While aluminum foil is flexible, it does not have much elasticity. The need for elasticity is reduced by making the dimension α of FIG. 3 small relative to the length of the encapsulating sheet 13. In our experiments, the length and width of the encapsulating sheet were twenty-eight inches and twelve inches, respectively, and the distance α was 0.035 inch. The aluminum foil was sufficiently flexible to mold itself firmly around the optical fibers to give dependable support. The aluminum foil that was used is commercially available under the tradename Reynolds Wrap and has a thickness of about 0.5 mil (0.0005 inch).

By using the adhesive layer 31 to bond the encapsulating sheet 13, one may use any flexible flame-resistant material that maintains its structural integrity and does not melt or ignite at temperatures of at least two hundred degrees Centigrade, and which does not rupture when subjected to the stresses of the apparatus of FIG. 1. Another such material is Mylar (a trademark) that has been appropriately doped, as is known in the art, to be flame-resistant. Various other embodiments and modifications may be made by those skilled in the art without departing from the spirit and scope of the invention.

We claim:

1. A method for encapsulating optical fibers comprising the steps of:

bonding optical fiber to a first surface of a flat member having first and second opposite major surfaces;

placing the flat member in a substantially air-tight chamber;

locating an encapsulating sheet in the air-tight chamber such that it is adjacent the first surface of the flat member, the sheet having first and second major surfaces, the first major surface of the sheet facing the first major surface of the flat member;

said encapsulating sheet being made of a flexible material that maintains its structural integrity and does not flow or ignite at temperatures of at least two hundred degrees Centigrade;

and making the gas pressure on the second major surface of the flat member to be significantly lower than the gas pressure on the second surface of the sheet, thereby causing the first major surface of the sheet to press against the first major surface of the flat member.

2. The method of claim 1 wherein:

the encapsulating sheet is substantially impermeable to gas and extends across the air-tight chamber to divide the chamber into first and second chamber portions, the first chamber portion containing the flat member;

and the making step comprises the step of applying a significantly lower air pressure to the first chamber portion than to the second chamber portion.

3. The method of claim 2 wherein:

the first chamber portion partly defined by a first enclosure member;

the second chamber portion is partly defined by a second enclosure member;

and the first and second enclosure members are clamped on opposite sides of the encapsulating sheet.

4. The method of claim 3 wherein:

the first and second enclosure members abut on opposite sides of the encapsulating sheet along an entire periphery of the substantially air-tight chamber;

and the encapsulating sheet constitutes a gasket for preventing air from entering the air-tight chamber at the juncture of the first and second enclosures members.

5. The method of claim 4 wherein:

the encapsulating sheet is made from a material selected from the group consisting of Kapton, doped Mylar and aluminum foil.

6. The method of claim 5 wherein:

the first chamber portion is connected to vacuum apparatus for making a partial vacuum in the first chamber portion;

and the second chamber portion is connected to a source of gas for maintaining a predetermined relatively high gas pressure in the second chamber portion.

7. The method of claim 6 wherein:

before the making step, both the first and second chamber portions are connected to vacuum apparatus to form a partial vacuum in the first and second chamber portions, and the encapsulating sheet is separated from the flat member by a spacer member;

during the making step, the partial vacuum is applied to the first chamber portion to cause the second surface of the flat member to bear against the first enclosure member;

and the encapsulating sheet is sufficiently elastic to bear against both the spacer and the first surface of the flat member.

8. The method of claim 1 wherein:

the flat member comprises an inflexible portion which defines its second surface and a flexible encapsulating substrate upon which the optical fibers are mounted;

and after adherence of the encapsulating sheet to the first surface of the flat member, the flexible encapsulating substrate is removed from the inflexible portion, whereby the optical fibers are encapsulated by the flexible encapsulating sheet and the flexible encapsulating substrate.

9. The method of claim 1 wherein:

the encapsulating sheet is made from a material selected from the group consisting of Kapton, Mylar, and aluminum foil.

10. The method of claim 8 wherein:

the flexible encapsulating sheet and the flexible encapsulating substrate are both made of Kapton.

11. The method of claim 9 wherein:

during substantially the entirety of the method, the air-tight chamber is maintained substantially at room temperature.

12. The method of claim 11 wherein:

the encapsulating sheet is made of a flame-resistant and substantially inelastic material.

13. A method for encapsulating optical fibers comprising the steps of:

placing a flat member in a substantially air-tight chamber, the flat member having on a first surface thereof routed optical fiber;

locating an encapsulating sheet made of a flexible material that maintains its structural integrity and does not flow or ignite at temperatures of at least two hundred degrees Centigrade in the air-tight chamber such that it is adjacent the first surface of the flat member, the sheet having first and second major surfaces, the first major surface of the sheet facing the first surface of the flat member;

said encapsulating sheet being substantially impermeable to gas and extending across the air-tight chamber to divide the chamber into first and second chamber portions, the first chamber portion containing the flat member;

and applying a significantly lower gas pressure to the first chamber portion than to the second chamber portion, thereby causing the first major surface of the sheet to press against the first surface of the flat member.

14. The method of claim 13 further comprising the step of:

covering the first surface of the flat member with an adhesive, thereby causing the first major surface of the sheet to adhere to the first surface of the flat member.

15. The method of claim 14 wherein:

the first chamber portion is partly defined by a first enclosure member;

the second chamber portion is partly defined by a second enclosure member;

the first and second enclosure members are clamped on opposite sides of the encapsulating sheet;

the first chamber portion is connected to vacuum apparatus for making a partial vacuum in the first chamber portion;

and the second chamber portion is connected to a source of gas for making a predetermined relatively high pressure in the second chamber portion.

16. The method of claim 15 wherein:

during the applying step, the air-tight chamber in maintained substantially at room temperature.

17. Apparatus for encapsulating optical fibers routed on the first surface of a substrate comprising:

an air-tight chamber adapted to contain therein said substrate and an encapsulating sheet arranged parallel to the substrate;

said encapsulating sheet being made of material substantially impermeable to gas and which extends across the air-tight chamber and has a first major surface facing the first surface of the substrate and a second major surface facing away from the substrate;

and means for making the gas pressure on the substrate to be significantly lower than the gas pressure on the second surface of the encapsulating sheet, thereby causing the first major surface of the sheet to press against the first surface of the substrate.

18. The apparatus of claim 17 wherein:

the air-tight chamber is defined by first and second enclosure members adapted to be clamped on opposite sides of said encapsulating sheet.

19. The apparatus of claim 18 wherein:

the first enclosure member and the encapsulating sheet define a first chamber portion adapted to be connected to vacuum apparatus for making a partial vacuum in the first chamber portion;

the second enclosure member and the encapsulating sheet define a second chamber portion adapted to be connected to a source of gas for maintaining the predetermined relatively high gas pressure in the second chamber portion.

20. The apparatus of claim 19 wherein:

both the first and second chamber portions are adapted to be connected to vacuum apparatus to form a partial vacuum in the first and second chamber portions, with the encapsulating sheet separated from the substrate by a spacer member; and the first chamber portion is adapted to be selectively connected to the vacuum apparatus while the second chamber portion is adapted to be connected to the source of gas to cause the substrate to be pulled against the first enclosure member as the first surface of the encapsulating sheet is pressed against the first surface of the substrate.

* * * * *